United States Patent [19]

Schmerling

[11] 3,892,815

[45] July 1, 1975

[54] FLAME RETARDANT COMPOUNDS AND COMPOSITIONS OF MATTER

[75] Inventor: Louis Schmerling, Riverside, Ill.

[73] Assignee: Universal Oil Products Company, Des Plaines, Ill.

[22] Filed: Sept. 13, 1973

[21] Appl. No.: 397,197

[52] U.S. Cl....... 260/649 R; 106/15 FP; 117/138.5; 117/138.8; 260/2.5 FP; 260/2.5 AJ; 260/45.7 R; 260/611.5; 260/881 R
[51] Int. Cl............................................. C07c 25/18
[58] Field of Search .................................... 260/649

[56] References Cited
UNITED STATES PATENTS

| 2,606,910 | 8/1952 | Herzfeld et al. | 260/649 R X |
| 2,673,172 | 3/1954 | Polen | 260/649 R X |
| 2,952,711 | 9/1960 | Roberts | 260/649 R |
| 2,952,712 | 9/1960 | Roberts et al. | 260/649 R X |
| 2,967,842 | 1/1961 | Roberts | 260/649 R X |
| 3,043,795 | 7/1962 | Roberts et al. | 260/649 R X |
| 3,090,817 | 5/1963 | Schmerling | 260/649 R |

OTHER PUBLICATIONS

Jason et al., J. Org. Chem., 26, 937–938, 1961.
Mamedaliev et al., Chem. Abs., 59, 1502f, 1963.
Akad. Nauk Azerb, SSR 18, No. 9, 15–17, 1962.

*Primary Examiner*—Howard T. Mars
*Attorney, Agent, or Firm*—James R. Hoatson, Jr.; Raymond H. Nelson; William H. Page

[57] ABSTRACT

Novel compounds comprising poly(polyhalonorbornenylalkyl)benzene as exemplified by 1,4-bis(1,3,4,5,6,7,7-heptachloro-5-norbornen-2-ylmethyl)-benzene are prepared by reacting an aromatic hydrocarbon containing at least two alkyl substituents with 1,2-dichloroethylene and thereafter reacting the resultant product with a polyhalo-substituted cycloalkadiene to form the desired compound. These compounds are useful for imparting flame retardant characteristics when admixed with a polymeric substance.

8 Claims, No Drawings

FLAME RETARDANT COMPOUNDS AND COMPOSITIONS OF MATTER

This invention relates to novel compounds comprising a poly(polyhalonorbornenylalkyl)benzene and particularly to the use thereof with polymeric substances to form novel compositions of matter which posses the desirable physical characteristics of being resistant to flame or fire retardant.

The novel compounds of the present invention comprising poly(polyhalonorbornenylalkyl)benzenes which are prepared according to the method hereinafter set forth in greater detail will be useful as additives to plastics, polymers, copolymers, terpolymers, resins, elastomers, rubbers, textiles and fibers, both naturally occurring and synthetic in nature, such as cotton, wool, Dacron, nylon rayon, etc., coatings, paints, varnishes, leather, foams, cellulose acetate butyrate, ethyl cellulose, cellulose propionate, etc., polyolefins such as polyethylene and polyethylene copolymers, polypropylene and polypropylene copolymers, polystyrene, polystyrene copolymers, polyvinylacetate or alcohol and copolymers, polyesters, polyurethane, polyphenyl ethers, polycarbonates, polyamides, polyoxymethylenes, polyalkylene oxides such as polyethylene oxide, polyacrylates and copolymers, polymethacrylates and copolymers with styrene, butadiene, acrylonitrile, etc., epoxy resins, acrylonitrile-butadiene-styrene formulations (commonly known as ABS), polybutylene and acrylic ester modified styrene-acrylonitrile (ASA), methyl-methacrylate-styrene-butadiene terpolymers, etc. whereby the desirable physical characteristics of flameproofing or fire retardancy will be imparted to the aforementioned materials. This property will possess special advantages when preparing plastic or resinous material which will be utilized in places which may be subjected to excessive heat or possible flame such as architectural panels for construction work, skydomes, skylights, wall plugs for electrical connections, ashtrays, etc. In addition, the compound when used as a constituent of paint, lacquer, varnishes, or protective coatings, films, etc. will also impart a fire resistancy to these compounds and, therefore, render them commercially attractive as articles of commerce. Furthermore, the flame retardancy of foams such as the polyurethane foams will greatly enhance their use as insulating material or soundproofing material. Also, besides imparting the desirable physical characteristics of flame retardancy to the various articles of manufacture, the additives will render clear plastics or resins more stable to color changes and therefore will be an important component of these compounds whenever it is desirable that discoloration of the finished product is to be avoided or will tend to render such articles unusable. It is also contemplated that the novel compositions of matter of this invention may also be used as an insecticide or as an ingredient in insecticidal formulations.

It is therefore an object of this invention to provide novel compounds which possess desirable physical characteristics.

Another object of this invention is to provide novel compositions of matter comprising a mixture of a polymeric substance and the novel compound of this invention whereby the finished product will possess the desirable physical characteristics of flameproofing and fire retardancy.

In one aspect an embodiment of this invention resides in a compound comprising a poly(polyhalonorbornenylalkyl)benzene.

Another embodiment of this invention is found in a flame retardant composition of matter comprising a polymer and a poly(polyhalonorbornenylalkyl)benzene.

A specific embodiment of this invention resides in a novel compound comprising 1,4-bis(1,3,4,5,6,7,7-heptachloro-5-norbornen-2-ylmethyl)benzene.

Another specific embodiment of this invention is found in a flame retardant composition comprising a mixture of polypropylene and 1,3,5-tris(1,3,4,5,6,7,7-heptachloro-5-norbornen-2-ylmethyl)benzene.

Other objects and embodiments will be found in the following further detailed description of the present invention.

As hereinbefore set forth the present invention is concerned with novel compounds comprising poly(polyhalonorbornenylalkyl)benzenes and to the use thereof as a flame retardant additive to polymeric substances. The novel compounds are prepared by the free radical-induced reaction of a polyalkyl-substituted benzene with 1,2-dichloroethylene followed by condensation of the bis- or more highly chloro-allylated reaction product with a polyhalo-substituted alkadiene, and particularly a polyhalo-substituted cyclopentadiene. Aromatic compounds which may be utilized as starting materials in the present process have attached to nuclear carbon atoms a carbon atom of a saturated hydrocarbon group to which last named carbon atom is attached at least one hydrogen atom. Thus, the aromatic hydrocarbon has alpha-carbon atoms attached to the aromatic nucleus to which alpha-carbon atom are attached at least one hydrogen atom, thus giving a structural unit which may be represented as follows:

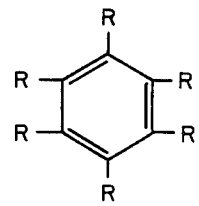

in which R represents hydrogen or an alkyl group containing from 1 to about 4 carbon atoms, at least two R's being alkyl. It is contemplated within the scope of this invention that the alkyl groups may be straight chained or branched chained in configuration. Some specific examples of these aromatic hydrocarbons which may be utilized as one of the starting materials of the present process will include ortho-xylene, meta-xylene, para-xylene, 1,2,3-trimethylbenzene (hemimellitene), 1,2,4-trimethylbenzene (pseudocumene), 1,3,5-trimethylbenzene (mesitylene), 1,2,3,4-tetramethylbenzene (prehnitol), 1,2,3,5-tetramethylbenzene (isodurene), 1,2,4,5-tetramethylbenzene (durene), pentamethylbenzene, hexamethylbenzene, 1,2-diethylbenzene, 1,3-diethylbenzene, 1,4-diethylbenzene, 1,2,3-triethylbenzene, 1,3,5-triethylbenzene, 1,2,4-triethylbenzene, 1,2,3,4-tetraethylbenzene, 1,2,3,5-tetraethylbenzene, 1,2,4,5-tetraethylbenzene, pentaethylbenzene, hexaethylbenzene, 1,2-di-n-propylbenzene, 1,3-di-n-propylbenzene, 1,4-di-n-propylbenzene, 1,2,3-tri-n-propylbenzene, 1,3,5-tri-n-propylbenzene, 1,2,4-tri-n-propylbenzene, 1,2,3,4-tetra-n-propylbenzene, 1,2,3,5-tetra-n-propylbenzene, 1,2,4,5-tetra-n-propylbenzene, penta-n-propylbenzene, hexa-n-propylbenzene, 1,2-diisopropylbenzene, 1,3-diisopropylbenzene 1,4-diisopropylbenzene, 1,2,3-triisopropylbenzene, 1,3,5-triisopropylbenzene, 1,2,4-triisopropylbenzene, 1,2,3,4-tetraisopropylbenzene, 1,2,3,5-tetraisopropylbenzene, 1,2,4,5-tetraisopropylbenzene, pentaisopropylbenzene, hexaisopropylbenzene, 1,2-di-n-butylbenzene, 1,3-di-n-butylbenzene, 1,4-di-n-butylbenzene, 1,2,3-tri-n-butylbenzene, 1,3,5-tri-n-butylbenzene, 1,2,4-tri-n-butylbenzene, 1,2,3,4-tetra-n-butylbenzene, 1,2,3,5-tetra-n-butylbenzene, 1,2,4,5-tetra-n-butylbenzene, penta-n-butylbenzene, hexa-n-butylbenzene, 1,2-di-sec-butylbenzene, 1,3-di-sec-butylbenzene, 1,4-di-sec-butylbenzene, 1,2,3-tri-sec-butylbenzene, 1,3,5-tri-sec-butylbenzene, 1,2,4-tri-sec-butylbenzene, 1,2,3,4-tetra-sec-butylbenzene, 1,2,3,5-tetra-sec-butylbenzene, 1,2,4,5-tetra-sec-butylbenzene, penta-sec-butylbenzene, hexa-sec-butylbenzene, 1,2-diisobutylbenzene, 1,3-diisobutylbenzene, etc. The aforementioned polyalkyl-substituted benzenes are reacted with 1,2-dichloroethylene in the presence of a free radical generating compound.

The catalysts that may be used in the process of the present invention are those which are capable of forming free radicals under the reaction conditions. These include diazonium compounds, metal akyls, and peroxy compounds. Peroxy compounds contain the bivalent radical —O—O— which decomposes to form free radicals which initiate the general reaction of the present invention. Examples of such peroxy compounds are the persulfates, perborates, percarbonates, of the ammonium and of the alkali metals; peracetic acid, persuccinic acid, dimethyl peroxide, diethyl peroxide, di-tert-butyl peroxide, dipropyl peroxide, acetyl benzoyl peroxide, propionyl peroxide, butyryl peroxide, lauroyl peroxide, benzoyl peroxide, tetralin peroxide, urea peroxide, tertiary-butyl perbenzoate, tertiarybutyl hydroperoxide, methylcyclohexyl hydroperoxide, 2,4-dichlorobenzoyl peroxide, methyl ethyl ketone peroxide, cyclohexanone peroxide, cumene hydroperoxide, diisopropylbenzene hydroperoxide, paramethane hydroperoxide, isopropyl percarbonate, etc. The organic peroxy compounds constitute a preferred class of catalysts for use in this invention. Mixtures of peroxy compound catalysts may be employed or the peroxy compound catalysts may be utilized in admixture with various diluents as catalysts for the process of this invention. Thus organic peroxy compounds which are compounded commercially with various diluents for use as free radical generating catalysts may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methyl ethyl ketone peroxide in dimethylphthalate, cyclohexanone peroxide with dibutyl phthalate, acetyl peroxide in dimethylphthalate, etc. Only catalytic amounts (less than stoichiometric amounts) need be used in the process.

In selecting a particular reaction temperature for use in the process of the present invention, two considerations must be taken into account. First, sufficient energy by means of heat must be applied to the reaction system so that the reactants, namely, the selected polyalkyl-substituted aromatic hydrocarbon and the polychloroolefin will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-tert-butyl peroxide is 17.5 hours at 125° C., 5.3 hours at 135° C., and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free radical generating catalyst is greater than 10 hours, radicals are not generated at a sufficient rate to cause the reaction of the process of the present invention to go forward at a detectable rate. Thus the reaction temperature may be within the range of from about 50° to about 300° C. and at least as high as the decomposition temperature of the catalyst, by which is meant a temperature such that the half life of the free radical generating catalyst is not greater than 10 hours. Since the half life for each free radical generating catalyst is different at different temperatures, the exact temperature to be utilized in a particular reaction will vary. However, persons skilled in the art are well acquainted with the half life vs. temperature data for different free radical generating catalysts and thus it is within the skill of one familiar with the art to select the particular temperature needed for any particular catalyst. Generally the operating temperature does not exceed the temperature at which the half life is not more than 10 hours by more than about 150° C. since free radical generating catalysts decompose rapidly under such conditions. However, in some instances temperatures as high as 300° C. may be utilized. The half life of tert-butyl perbenzoate is less than 10 hours at about 110° C., and accordingly when this peroxy compound is used as the catalyst for this process, the operating temperature is from about 110° C. to about 300° C., but generally not greater than about 265° C. An operating temperature of from about 130° C. to about 300° C. is used with a di-tert-butyl peroxide, and from about 75° to about 300° C., but generally not greater than about 225° C., with benzoyl peroxide. Little advantage is gained if the temperature is too high even though the reactants tend to become more activated in the presence of the free radical generating catalyst decomposing at a high rate since decomposition of the dichloroethylene takes place at temperatures above about 300° C.

Although pressure of up to 100 atmospheres may be utilized, the reaction preferably takes place in liquid phase and thus the pressure will preferably range from about atmospheric to about 100 atmospheres such that a substantial proportion of the reactants is in the liquid phase. Pressure is not an important variable in the process of this invention. However, because of the low boiling points of some of the reactants, it is necessary to utilize pressure withstanding equipment to insure liquid phase conditions. In batch type operations, it is often desirable to utilize pressure withstanding equipment to charge the reactants and catalyst to the vessel, and to pressure the vessel with 10 or 30 or 50 or more atmospheres of an inert gas such as nitrogen. This helps to insure the presence of liquid phase conditions. However, when the mole quantity of reactants is sufficient, the pressure which they themselves generate at the temperature utilized is sufficient to maintain the desired phase conditions. Nitrogen is also conveniently utilized when a glass liner is used along with pressure withstanding equipment. Since the nitrogen is pressured into the vessel prior to heating, it tends to maintain the reactants within the glass liner and thus aids in their removal after the passage of the desired period of time at the reaction temperature selected.

The concentration of the catalyst employed in this process may vary over a rather wide range but for reasons of economy, it is desirable to use low concentrations of catalyst, such as from about 0.1% to about 10% of the total weight of the polychloroolefin and polyalkyl-substituted aromatic hydrocarbon charged to the process. The reaction time may be within the range of less than one minute to several hours, depending upon temperature and half life of the free radical generating catalyst, as set forth hereinabove. Generally, contact times of at least 10 minutes are preferred.

The reaction between the polyalkyl-substituted aromatic hydrocarbon and the polychloroolefin may be effected in either a batch or continuous type operation. When utilizing a batch type operation, a quantity of the polyalkyl-substituted aromatic hydrocarbon and the free radical generating catalyst are placed in an appropriate apparatus which may be provided with heating and mixing means, adding the polychloroolefin to the reaction mixture and thereafter heating to a predetermined reaction temperature while thoroughly admixing the contents of the reactor. Upon completion of the desired residence time which may range from about 0.5 up to about 10 hours or more in duration, the reactor and contents thereof are allowed to cool to room temperature and the desired condensation product is recovered by conventional means well known in the art. Another method of effecting the reaction is in a continuous type of operation. When this method of operation is employed, the polyalkyl-substituted aromatic hydrocarbon, the polychloroolefin and the free radical generating compound are continuously charged to a reactor which is maintained at the proper operating conditions of temperature and pressure. Upon completion of the reaction time, the condensation products are separated from the reactor effluent which has been continuously withdrawn and the unreacted starting materials are then recycled to the reaction zone.

The poly(chloroallyl)benzenes which have been produced according to the aboveve paragraph are then subjected to a condensation reaction utilizing a polyhalo-substituted cycloalkadiene as the second reactant. Examples of polyhalo-substituted cycloalkadienes which may be utilized will include 1,2-dichlorocyclopentadiene, 1,2,3-trichlorocyclopentadiene, 1,2,3,4-tetrachlorocyclopentadiene, 1,2,3,4,5-pentachlorocyclopentadiene, hexachlorocyclopentadiene, 1,2-dibromocyclopentadiene, 1,2,3-tribromocyclopentadiene, 1,2,3,4-tetrabromocyclopentadiene, 1,-2,3,4,5-pentabromocyclopentadiene, hexabromocyclopentadiene, etc. It is also contemplated within the scope of this invention that polyhalo-substituted conjugated cyclohexadienes may also be employed, although not necessarily with equivalent results. Representative examples of these cyclohexadienes of the 1,3-cyclohexadiene type, hereinafter referred to as cyclohexadienes, will include 1,2-dichlorocyclohexadiene, 1,2,3-trichlorocyclohexadiene, 1,2,3,4-tetrachlorocyclohexadiene, 1,2,3,4,5-pentachlorocyclohexadiene, 1,2,3,4,5,5-hexachlorocyclohexadiene, 1,2,3,4,5,5,6,6-octachlorocyclohexadiene, the corresponding bromo-substituted compounds, etc. The condensation between the polyhalo-substituted cycloalkadiene and the poly(chloroallyl)-benzene may be effected at elevated temperatures ranging from about 100° to about 200° C. or more and preferably at atmospheric pressure. It is also contemplated within the scope of this invention that superatmospheric pressures may also be employed in this step of the reaction, any superatmospheric pressure being afforded by the introduction of a substantially inert gas such as nitrogen into the reaction zone, the amount of pressure which is to be employed being that which is sufficient to maintain a major portion of the reactants in a liquid phase. In addition, if so desired, an inert organic solvent may also be employed in this step of this reaction, said solvents including paraffins such as n-pentane, n-hexane, n-heptane, cyclopentane, cyclohexane, methylcyclopentane, etc.

As in the first step of the reaction, the condensation of the two reactants may also be effected in either a batch or continuous type operation. For example, when a batch type operation is used, a quantity of the poly(-chloroallyl)benzene and the polyhalo-substituted cycloalkadiene (and, if desired, a diluent such as toluene) is placed in an appropriate apparatus along with any solvent, if so desired, the reaction apparatus is then heated to the desired operating temperature and maintained thereat for a predetermined residence time which again may range from about 0.5 up to about 10 hours or more in duration, the reactants being thoroughly admixed during the reaction period. In the event that superatmospheric pressures are to be employed, the reaction apparatus will comprise an autoclave of the rotating or mixing type, the reactants being charged to the autoclave which is thereafter sealed, raised to the required operating pressure by means of introduction of the inert gas and thereafter heated to the desired operating temperature. Upon completion of the desired residence time, heating is discontinued, the autoclave is allowed to return to room temperature, the excess pressure is vented and the reaction mixture is recovered therefrom. The desired reaction product is then recovered by conventional means such as washing, drying, fractional distillation under reduced pressure followed by treatment of the bottoms by recrystallization in order to recover the desired product.

Examples of novel compounds of the present invention which may be prepared by the methods hereinbefore set forth will include those compounds characterized by the formula:

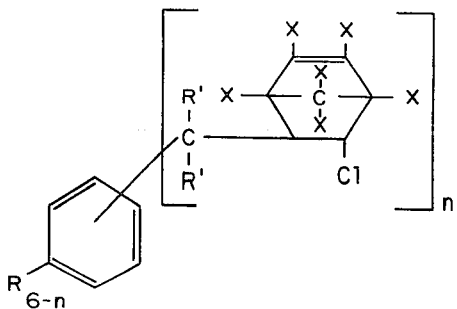

in which X is selected from the group consisting of hydrogen and halogen atoms, especially chlorine and bromine, at least two X's being halogen, R' is selected from the group consisting of hydrogen and lower alkyl groups, R is selected from the group consisting of hydrogen and lower alkyl radicals containing from 1 to about 4 carbon atoms and $n$ is an integer of from 2 to 6.

Some representative examples of these compounds will include 1,4-bis(1,3,4-trichloro-5-norbornen-2-ylmethyl)benzene, 1,4-bis-(1,3,4,5,6-pentachloro-5-norbornen-2-ylmethyl)benzene, 1,4-bis(1,3,4,5,6,7,7-heptachloro-5-norbornen-2-ylmethyl)benzene, 1,3-bis(1,3,4-trichloro-5-norbornen-2-ylmethyl)benzene, 1,3-bis(1,3,4,5,6-pentachloro-5-norbornen-2-ylmethyl)-5-methylbenzene, 1,3-bis(1,3,4,5,6,7,7-heptachloro-5-norbornen-2-ylmethyl)benzene, 1,2-bis(1,3,4-trichloro-5-norbornen-2-ylmethyl)benzene, 1,2-bis(1,3,4,5,6-pentachloro-5-norbornen-2-ylmethyl)benzene, 1,2-bis(1,3,4,5,6,7,7-heptachloro-5-norbornen-2-ylmethyl)benzene, 1,3,5-tris(1,3,4-trichloro-5-norbornen-2-ylmethyl)benzene, 1,3,5-tris(1,3,4,5,6-pentachloro-5-norbornen-2-ylmethyl)benzene, 1,3,5-tris(1,3,4,5,6,7,7-heptachloro-5-norbornen-2-ylmethyl)benzene, 1,2,3-tris(1,3,4-trichloro-5-norbornen-2-ylmethyl)benzene, 1,2,3-tris(1,3,4,5,6-pentachloro-5-norbornen-2-ylmethyl)benzene, 1,2,3-tris(1,3,4,5,6,7,7-heptachloro-5-norbornen-2-ylmethyl)benzene, 1,2,4-tris(1,3,4-trichloro-5-norbornen-2-ylmethyl)benzene, 1,2,4-tris(1,3,4,5,6-pentachloro-5-norbornen-2-ylmethyl)benzene, 1,2,4-tris(1,3,4,5,6,7,7-heptachloro-5-norbornen-2-ylmethyl)benzene, 1,2,3,-4-tetra(1,3,4-trichloro-5-norbornen-2-ylmethyl)benzene, 1,2,3,4-tetra(1,3,4,5,6-pentachloro-5-norbornen-2-ylmethyl)benzene, 1,2,3,-4-tetra(1,3,4,5,6,7,7-heptachloro-5-norbornen-2-ylmethyl)benzene, 1,4-bis(1,3,4,5,6-pentachloro-5-norbornen-2-ylmethyl)-2,3,5,6-tetramethylbenzene, 1,4-bis(1,3,4,5,6,7,7-heptachloro-5-norbornen-2-ylmethyl)-2,3,5,6-tetramethylbenzene, 1,3-bis(1,3,4,5,6-pentachloro-5-norbornen-2-ylmethyl)-2,4,5,6-tetramethylbenzene, 1,3-bis(1,3,4,5,6,7,7-heptachloro-5-norbornen-2-ylmethyl)-2,3,5,6-tetramethylbenzene, 1,3-bis[α-(1,3,6-trichloro-5norbornen-2yl)ethyl]benzene, 1,2-bis[α-(1,3,4,5,6-pentachloro-5-norbornen-2-yl)ethyl]benzene, 1,2-bis[α-(1,3,4,5,6,7,7-heptachloro-5-norbornen-2-yl)ethyl]benzene, 1,3-bis[α-(1,3,6-trichloro-5norbornen-2-yl)-ethyl]benzene, 1,3-bis[α-(1,3,4,5,6-pentachloro-5-norbornen-2-yl)ethyl]benzene, 1,3-bis[α-(1,3,4,5,6,7,7-heptachloro-5-norbornen-2-yl)ethyl]-benzene, 1,4-bis[α-(1,3,4-trichloro-5-norbornen-2-yl)ethyl]benzene, 1,4-bis[α-(1,3,4,5,6-pentachloro-5-norbornen-2-yl)ethyl]benzene, 1,4-bis[α-(1,3,4,5,6,7,7-heptachloro-5norbornen-2-yl)ethyl]benzene, 1,3,5-tris[α-(1,3,4-trichloro-5-norbornen-2-yl)ethyl]benzene, 1,3,5-tris[α-(1,3,4,5,6-pentachloro-5-norbornen-2-yl)ethyl]benzene, 1,3,5-tris[α-(1,3,4,5,6,7,7-heptachloro-5-norbornen-2-yl)ethyl]benzene, 1,2-bis[α-(1,3,6-trichloro-5-norbornen-2-yl)propyl]benzene, 1,2-bis[α-(1,3,4,5,6-pentachloro-5-norbornen-2-yl)propyl] benzene, 1,2-bis[α-(1,3,4,5,6,7,7-heptachloro-5-norbornen-2-yl)propyl]benzene, 1,3-bis[α-(1,3,4-trichloro-5-norbornen-2-yl)propyl]benzene, 1,3-bis[α-(1,3,4,5,6-pentachloro-5-norbornen-2-yl)propyl]benzene, 1,3-bis[α-(1,3,4,5,6,7,7-heptachloro-5-norbornen-2-yl)propyl]benzene, 1,4-bis[α-(1,3,6-trichloro-5-norbornen-2-yl)propyl]-benzene, 1,4-bis[α-(1,3,4,5,6-pentachloro-5-norbornen-2-yl)propyl]benzene, 1,4-bis[α-(1,3,4,5,6,7,7-heptachloro-5-norbornen-2-yl)propyl]benzene, 1,3,5-tris[α-(1,3,6-trichloro-5-norbornen-2-yl)propyl]benzene, 1,3,5-tris[α-(1,3,4,5,6-pentachloro-5-norbornen-2-yl)propyl]benzene, 1,3,5-tris[α-(1,3,4,5,6,7,7-heptachloro-5-norbornen-2yl)propyl]benzene, 1,2-bis(3-chloro-1,4-dibromo-5-norbornen-2-ylmethyl)benzene, 1,2-bis(3-chloro-1,4,5,6-tetrabromo-5-norbornen-2-ylmethyl)benzene, 1,2-bis(3-chloro-1,4,5,6,7,7-hexabromo-5-norbornen-2-ylmethyl)benzene, 1,4-bis-(3-chloro-1,4-dibromo-5-norbornen-2-ylmethyl)benzene, 1,4-bis(3-chloro-1,4,5,6-tetrabromo-5-norbornen-2-ylmethyl)benzene, 1,4-bis(3-chloro-1,4,5,6,7,7-hexabromo-5-norbornen-2-ylmethyl)benzene, 1,3,5-tris(3-chloro-1,6-dibromo-5-norbornen-2-ylmethyl)benzene, 1,3,5-tris(3-chloro-1,4,5,6-tetrabromo-5-norbornen-2-ylmethyl)benzene, 1,3,5-tris(3-chloro-1,4,5,6,7,7-hexabromo-5-norbornen-2-ylmethyl)benzene, 1,4-bis[α-(3-chloro-1,4-dibromo-5-norbornen-2-yl)ethyl]benzene, 1,4-bis[α-(3-chloro-1,4,5,6-tetrabromo-5-norbornen-2-yl)ethyl]benzene, 1,4-bis[α-(1-chloro-1,4,5,6,7,7-hexabromo-5-norbornen-2-yl)ethyl]benzene, etc. It is to be understood that the aforementioned poly(polyhalonorbornenylalkyl)benzenes are only representative of the class of compounds which may be prepared and that the present invention is not necessarily limited thereto.

The aforementioned poly(polyhalonorbornenylalkyl)benzenes are admixed with polymeric compounds of the type hereinbefore set forth in greater detail, said polymeric compounds including, but not limited to, polymers, copolymers, terpolymers, resins, polycondensates, rubbers, textiles and fibers, etc., to form novel compositions of matter which will possess the desirable physical characteristics of being fire resistant or flame retardant. The novel compounds of the present invention are present in an amount ranging from about 1% to about 50% by weight of the final flame retardant composition of matter. It is contemplated that the desired compositions of matter may be prepared in any suitable manner and the novel compounds may be admixed with the polymeric substance in a mixer, may be milled, or may be extruded after admixing by any means well known in the art, the only criterion being that the two components of the mixture be admixed so that there is a uniform distribution of the novel compound throughout the entire composition of matter, thereby imparting a uniform degree of flame retardancy to the final composition of matter.

Some representative examples of the final novel flame retardant compositions of matter of the present invention will include polyethylene and 1,2-bis(1,3,4,5,6-pentachloro-5-norbornen-2-ylmethyl)benzene, polyethylene and 1,3-bis(1,3,4,5,6-pentachloro-5-norbornen-2-ylmethyl)benzene, polyethylene and 1,4-bis(1,3,4,5,6-pentachloro-5-norbornen-2-ylmethyl)benzene, polyethylene and 1,2-bis(1,3,4,5,6,7,7-heptachloro-5-norbornen-2-ylmethyl)benzene, polyethylene and 1,3-bis(1,3,4,5,6,7,7-heptachloro-5-norbornen-2-ylmethyl)benzene, polyethylene and 1,4-bis-(1,3,4,5,6,7,7-heptachloro-5-norbornen-2-ylmethyl)benzene, polyethylene and 1,3,5-tris(1,3,4,5,6-pentachloro-5-norbornen-2-ylmethyl)benzene, polyethylene and 1,3,5-tris(1,3,4,5,6,7,7-heptachloro-5-norbornen-2-ylmethyl)benzene, polyethylene and 1,4-bis(1,3,4,5,6,7,7-heptachloro-5-norbornen-2-ylmethyl)-2,3,5,6-tetramethylbenzene, polyethylene and 1,4-bis[α-(1,3,4,5,6,7,7-heptachloro-5-norbornen-2-yl)ethyl]benzene, polyethylene and 1,4-bis(3-chloro-1,4,5,6,7,7-hexabromo-5-norbornen-2-ylmethyl)benzene, polyethylene and 1,3,5-tris(3-chloro-1,4,5,6,7,7-hexabromo-5-norbornen-2-ylmethyl)benzenee, polypropylene and 1,2-bis-(1,3,4,5,6-pentachloro-5-norbornen-2-ylmethyl)benzene, polypropylene and 1,3-bis(1,3,4,5,6-pentachloro-5-norbornen-2-ylmethyl)benzene, polypropylene and 1,4-bis(1,3,4,5,6-pentachloro-5-norbornen-2-ylmethyl)benzene, polypropylene and 1,2-bis(1,3,4,5,6,7,7-heptachloro-5-norbornen-2-ylmlethyl)benzene, polypropylene and 1,3-bis(1,3,4,5,6,7,7-heptachloro-5-norbornen-2-ylmethyl)benzene, polypropylene and 1,4-bis(1,3,4,5,6,7,7-heptachloro-5-norbornen-2-ylmethyl)benzene, polypropylene and 1,3,5-tris-(1,3,4,5,6-pentachloro-5-norbornen-2-ylmethyl)benzene, polypropylene and 1,3,5-tris(1,3,4,5,6,7,7-heptachloro-5-norbornen-2-ylmethyl)benzene, polypropylene and 1,4-bis(1,3,4,5,6,7,7-heptachloro-5-norbornen-2-ylmethyl)-2,3,5,6-tetramethylbenzene, polypropylene and 1,2-bis[α-(1,3,4,5,6,7,7-heptachloro-5-norbornen-2-yl)ethyl]benzene, polypropylene and 1,4-bis-(3-chloro-1,4,5,6,7,7-hexabromo-5-norbornen-2-ylmethyl)benzene, polypropylene and 1,3,5-tris(3-chloro-1,4,5,6,7,7-hexabromo-5-norbornen-2-ylmethyl)benzene, ABS and 1,2-bis(1,3,4,5,6-pentachloro-5-norbornen-2-ylmethyl)benzene, ABS and 1,3-bis(1,3,4,5,6-pentachloro-5-norbornen-2-ylmethyl)benzene, ABS and 1,4-bis(1,3,4,5,6-pentachloro-5-norbornen-2-ylmethyl)benzene, ABS and 1,2-bis(1,3,4,5,6,7,7-heptachloro-5-norbornen-2-ylmethyl)benzene, ABS and 1,3-bis(1,3,4,5,6,7,7-heptachloro-5-norbornen-2-ylmethyl)benzene, ABS and 1,4-bis(1,3,4,5,6,7,7-heptachloro-5-norbornen-2-ylmethyl)benzene, ABS and 1,3,5-tris(1,3,4,5,6-pentachloro-5-norbornen-2-ylmethyl)benzene, ABS and 1,3,5-tris(1,3,4,5,6,7,7-heptachloro-5-norbornen-2-ylmethyl)benzene, ABS and 1,4-bis(1,3,4,5,6,7,7-heptachloro-5-norbornen-2-ylmethyl)-2,3,5,6-tetramethylbenzene, ABS and 1,2-bis[α-(1,3,4,5,6,7,7-heptachloro-5-norbornen-2-yl)ethyl]benzene, ABS and 1,4-bis(3-chloro-1,4,5,6,7,7-hexabromo-5-norbornen-2-ylmethyl)benzene, ABS and 1,3,5-tris(3-chloro-1,4,5,6,7,7-hexabromo-5-norbornen-2-ylmethyl)benzene, epoxy resin and 1,2-bis(1,3,4,5,6-pentachloro-5-norbornen-2-ylmethyl)benzene, epoxy resin and 1,3-bis(1,3,4,5,6-pentachloro-5-norbornen-2-ylmethyl)benzene, epoxy resin and 1,4-bis(1,3,4,5,6-pentachloro-5-norbornen-2-ylmethyl)benzene, epoxy resin and 1,2-bis(1,3,4,5,6,7,7-heptachloro-5-norbornen-2-ylmethyl)benzene, epoxy resin and 1,3-bis(1,3,4,5,6,7,7-heptachloro-5-norbornen-2-ylmethyl)benzene, epoxy resin and 1,4-bis-(1,3,4,5,6,7,7-heptachloro-5-norbornen-2-ylmethyl)benzene, epoxy resin and 1,3,5-tris(1,3,4,5,6-pentachloro-5-norbornen-2-ylmethyl)benzene, epoxy resin and 1,3,5-tris(1,3,4,5,6,7,7-heptachloro-5-norbornen-2-ylmethyl)benzene, epoxy resin and 1,4-bis(1,3,4,5,6,7,7-heptachloro-5-norbornen-2-ylmethyl)-2,3,5,6-tetramethylbenzene, epoxy resin and 1,2-bis[α-(1,3,4,5,6,7,7-heptachloro-5-norbornen-2-yl)ethyl]benzene, epoxy resin and 1,4-bis(3-chloro-1,4,5,6,7,7-hexabromo-5-norbornen-2-ylmethyl)benzene, epoxy resin and 1,3,5-tris(3-chloro-1,4,5,6,7,7-hexabromo-5-norbornen-2-ylmethyl)benzene, polyester and 1,2-bis(1,3,4,5,6-pentachloro-5-norbornen-2-ylmethyl)benzene, polyester and 1,3-bis(1,3,4,5,6-pentachloro-5-norbornen-2-ylmethyl)benzene, polyester and 1,4-bis(1,3,4,5,6-pentachloro-5-norbornen-2-ylmethyl)benzene, polyester and 1,2-bis(1,3,4,-5,6,7,7-heptachloro-5-norbornen-2-ylmethyl)benzene, polyester and 1,3-bis(1,3,4,5,6,7,7-heptachloro-5-norbornen-2-ylmethyl)benzene, polyester and 1,4-bis(1,3,4,5,6,7,7-heptachloro-5-norbornen-2-ylmethyl)benzene, polyester and 1,3,5-tris(1,3,4,5,6-pentachloro-5-norbornen12-ylmethyl)benzene, polyester and 1,3,5-tris(1,3,4,5,6,7,7-heptachloro-5-norbornen-2-ylmethyl)benzene, polyester and 1,4-bis(1,3,4,5,6,7,7-heptachloro-5-norbornen-2-ylmethyl)-2,3,5,6-tetramethylbenzene, polyester and 1,2-bis-[α-(1,3,4,5,6,7,7-heptachloro-5-norbornen-2-yl)ethyl]benzene, polyester and 1,4-bis(3-chloro-1,4,5,6,7,7-hexabromo-5-norbornen-2-ylmethyl)benzene, polyester and 1,3,5-tris(3-chloro-1,4,5,6,7,7-hexabromo-5-norbornen-2-ylmethyl)benzene, polyethylene oxide and 1,2-bis(1,3,4,5,6-pentachloro-5-norbornen-2-ylmethyl)benzene, polyethylene oxdie and 1,3-bis(1,3,4,5,6-pentachloro-5-norbornen-2-ylmethyl)benzene, polyethylene oxide and 1,4-bis(1,3,4,5,6-pentachloro-5-norbornen-2-ylmethyl)benzene, polyethylene oxide and 1,2-bis(1,3,4,5,6,7,7-heptachloro-5-norbornen-2-ylmethyl)benzene, polyethylene oxide and 1,3-bis(1,3,4,5,6,7,7-heptachloro-5-norbornen-2-ylmethyl)benzene, polyethylene oxide and 1,4-bis(1,3,4,5,6,7,7-heptachloro-5-norbornen-2-ylmethyl)benzene, polyethylene oxide and 1,3,5-tris(1,3,4,5,6-pentachloro-5-norbornen-2-ylmethyl)benzene, polyethylene oxide and 1,3,5-tris(1,3,4,5,6,7,7-heptachloro-5-norbornen-2-ylmethyl)benzene, polyethylene oxide and 1,4-bis(1,3,4,5,6,7,7-heptachloro-5-norbornen-2-ylmethyl)-2,3,5,6-tetramethylbenzene, polyethylene oxide and 1,2-bis[α-(1,3,4,5,6,7,7-heptachloro-5-norbornen-2-yl)ethyl]benzene, polyethylene oxide and 1,4-bis(3-chloro-1,4,5,6,7,7-hexabromo-5-norbornen-2-ylmethyl)benzene, polyethylene oxide and 1,3,5-tris(3-chloro-1,4,5,6,7,7-hexabromo-5-norbornen-2-ylmethyl)benzene, polyisoprene and 1,2-bis(1,3,4,5,6-pentachloro-5-norbornen-2-ylmethyl)benzene, polyisoprene and 1,3-bis(1,3,4,5,6-pentachloro-5-norbornen-2-ylmethyl)benzene, polyisoprene and 1,4-bis(1,3,4,5,6-pentachloro-5-norbornen-2-ylmethyl)benzene, polyisoprene and 1,2-bis-(1,3,4,5,6,7,7-heptachloro-5-norbornen-2-ylmethyl)benzene, polyisoprene and 1,3-bis(1,3,4,5,6,7,7-heptachloro-5-norbornen-2-ylmethyl)benzene, polyisoprene and 1,4-bis(1,3,4,5,6,7,7-heptachloro-5-norbornen-2-ylmethyl)benzene, polyisoprene and 1,3,5-tris(1,3,4,5,6-pentachloro-5-norbornen-2-ylmethyl)benzene, polyisoprene and 1,3,5-tris(1,3,4,5,6,7,7-heptachloro-5-norbornen-2-ylmethyl)benzene, polyisoprene and 1,4-bis(1,3,4,5,6,7,7-heptachloro-5-norbornen-2-ylmethyl)-2,3,5,6-tetramethylbenzene, polyisoprene and 1,2-bis[$\alpha$-(1,3,4,5,6,7,7-heptachloro-5-norbornen-2-yl)ethyl]benzene, polyisoprene and 1,4-bis(3-chloro-1,4,5,6,7,7-hexabromo-5-norbornen-2-ylmethyl)benzene, polyisoprene and 1,3,5-tris(3chloro-1,4,5,6,7,7-hexabromo-5-norbornen-2-ylmethyl)benzene, etc. The aforementioned mixture of compounds which also constitute novel compositions of matter of the present invention will exhibit an unexpectedly high degree of fire resistance when compared to polymeric compounds which do not possess all of the components of the finished product, these aforementioned products being only representative of the class of compositions of matter of the present invention; and, therefore, this invention is not necessarily limited to these compositions of matter.

The following examples are given to illustrate the novel compounds and novel compositions of matter of the present invention, which examples, however, are not intended to limit the generally broad scope of the present invention in strict accordance therewith.

EXAMPLE I

To a rotating autoclave is charged a glass liner containing 106 grams (0.1 mole) of para-xylene along with 194 grams (2.0 mole) of 1,2-dichloroethylene and 8 grams of di-t-butyl peroxide. The autoclave is thereafter sealed, the air in the autoclave is swept out with nitrogen and the autoclave is pressured to the initial operating pressure by the addition of 30 atmospheres of nitrogen. The autoclave is then heated to a temperature of about 130° C. and maintained thereat for a period of 4 hours. During this time, the pressure in the autoclave will rise to about 60 atmospheres. At the end of the 4-hour period, heating is discontinued and the autoclave is allowed to cool to room temperature, the excess pressure is discharged and the contents of the autoclave, after neutralization of the hydrogen chloride which is produced during the reaction, is subjected to fractional distillation under reduced pressure. The desired product comprising p-bis(3-chloroallyl)benzene is separated from unreacted starting materials and recovered.

The dichloroallylbenzene which is prepared according to the above paragraph is placed in a reaction flask along with hexachlorocyclopentadiene in a mole ratio of 2 moles of hexachlorocyclopentadiene per mole of bis(chloroallyl)benzene. In addition a solvent comprising 1,2,3,4-tetrahydronaphthalene is added thereto and the reaction mixture is gradually heated from a temperature of 125° to 175° C. After heating the flask at this temperature for a period of 4 hours, the reaction mixture is recovered and subjected to fractional distillation under reduced pressure. The unreacted starting materials are distilled over and the bottoms are recovered. The bottoms are then recrystallized by treatment with xylene and recovered, said bottoms comprising the desired compound, namely, 1,4-bis(1,3,4,5,6,7,7-heptachloro-5-norbornen-2-ylmethyl)benzene.

EXAMPLE II

To a rotating autoclave is charged a mixture of 120 grams (1.0 mole) of 1,3,5-trimethylbenzene (mesitylene), 291 grams (3.0 mole) of 1,2-dichloroethylene and 8 grams of di-t-butyl peroxide. The autoclave is sealed and nitrogen pressed in until an initial operating pressure of 30 atmospheres is reached. The autoclave is then heated to a temperature of 130° C. and maintained in a range of from 130°–140° C. for a period of 4 hours, the pressure during this time reaching about 60 atmospheres. At the end of the 4-hour period, heating is discontinued and the autoclave is allowed to return to room temperature, the pressure dropping back to 30 atmospheres. Upon reaching room temperature, the excess pressure is discharged and the autoclave is opened. The reaction mixture is neutralized to remove the hydrogen chloride which is produced during the reaction, recovered and subjected to fractional distillation under reduced pressure whereby the desired product comprising 1,3,5-tris(3-chloroallyl)benzene is recovered.

To a second rotating autoclave is added 1 mole of the tris(chloroallyl)benzene prepared according to the above paragraph along with 3 mole proportions of hexachlorocyclopentadiene and 100 cc. of xylene. The autoclave is sealed and heated to a temperature of 125° to 150° C. under a pressure of 30 atmospheres of nitrogen for a period of 4 hours. At the end of the 4-hour period, heating is discontinued, the autoclave is allowed to return to room temperature and the excess pressure is discharged. The reaction product is recovered, and after flashing off the solvent, is subjected to fractional distillation under reduced pressure. The bottoms from the fractional distillation are recovered, extracted with xylene and recrystallized therefrom, said crystals comprising the desired product, namely, 1,3,5-tris(1,3,4,5,6,7,7-heptachloro-5-norbornen-2-ylmethyl)benzene.

EXAMPLE III

In this example a mixture of 162 grams (1.0 mole) of hexamethylbenzene and 194 grams (2.0 mole) of 1,2-dichloroethylene along with 8 grams of di-t-butyl peroxide is placed in a rotating autoclave which is thereafter sealed and pressured to 30 atmospheres with nitrogen. Following this, the autoclave is heated to a temperature of 130° C. and maintained in a range of from 130°–140° C. for a period of 4 hours. At the end of the 4-hour period, heating is discontinued, the autoclave is allowed to return to room temperature and the excess pressure is discharged therefrom. After discharge of the pressure, the autoclave is opened and the reaction mixture is recovered, neutralized to remove the hydrogen chloride produced during the reaction and subjected to fractional distillation under reduced pressure. The desired compound comprising a mixture of bis(3-chloroallyl)-2,3,5,6-tetramethylbenzenes is recovered from the distillation.

To a second rotating autoclave is added 1 mole proportion of the product prepared in the above paragraph along with 2 mole proportions of hexachlorocyclopentadiene. In addition 100 cc. of toluene which acts as a solvent is added to the autoclave which is thereafter sealed, pressured with 30 atmospheres of nitrogen and heated to a temperature of 125° C. The autoclave is maintained at this temperature and pressure for a period of 4 hours, at the end of which time heating is discontinued. Upon reaching room temperature, the excess pressure is discharged, the autoclave is opened and the reaction mixture is recovered therefrom. After flashing off the solvent and subjecting the mixture to fractional distillation under reduced pressure, the bottoms are recovered and recrystallized from methanol or mesitylene. The recovered crystals comprise the desired product, namely, 1,4-bis(1,3,4,5,6,7,7-heptachloro-5-norbornen-2-ylmethyl)-2,3,5,6-tetramethylbenzene.

EXAMPLE IV

In a manner similar to that set forth in the above examples, 1 mole proportion of meta-xylene is reacted with 2 mole proportions of 1,2-dichloroethylene, said reaction being effected in a rotating autoclave in the presence of di-t-butyl peroxide at a temperature of 130° 140° C. and at a pressure of 30 atmospheres for a period of 4 hours. At the end of the 4-hour period, the autoclave is allowed to return to room temperature, the excess pressure is discharged and the reaction product is treated in a manner similar to that set forth in the above examples.

The desired reaction product which is prepared according to the above paragraph and which comprises 1,3-bis(3-chloroallyl)benzene is reacted with 1,2,3,4-tetrachlorocyclopentadiene, the reactants being present in an amount of 1 mole proportion of the chloroallylbenzene to two mole proportions of the cyclopentadiene. The condensation is effected by treating the reactants in a rotating autoclave in the presence of benzene at a temperature of 125° C. for a period of 4 hours. The reaction product which is recovered from the autoclave after the desired residence time has elapsed is subjected to fractional distillation and recrystallization of the bottoms whereby the desired product comprising 1,3-bis(1,3,4,5,6-pentachloro-5-norbornen-2-ylmethyl)benzene is separated and recovered.

EXAMPLE V

To an alkylation flask is added 120 grams (1.0 mole) of 1,3,5-trimethylbenzene (mesitylene) and 291 grams (3.0 mole) of 1,2-dichloroethylene along with 5 grams of benzoyl peroxide. The mixture is heated under reflux at a temperature of 90° C. and maintained at this temperature for a period of 0.5 hours, the evolution of hydrogen chloride taking place during this period. The mixture is allowed to cool to room temperature and an additional 5 grams of benzoyl peroxide is added. The mixture is again heated at 90° C. for an additional period of 2 hours, cooled and 5 grams of benzoyl peroxide is again added and the mixture heated to reflux for 1.5 hours more. At the end of this time, heating is discontinued, the reaction mixture is allowed to cool to room temperature and the reaction mixture is subjected to fractional distillation under reduced pressure. The desired product comprising 1,3,5-tris(3-chloroallyl)benzene is recovered from the fractional distillation. Following this, 1 molecular proportion of this product is treated with 3 molecular proportions of 1,2,3,4-tetrachlorocyclopentadiene in a second alkylation flask at a temperature of 150° C. for a period of 4 hours, said reaction being effected in the presence of 100 grams of a solvent comprising tetrahydronaphthalene. At the end of the 4-hour period, heating is discontinued and after the flask has cooled, the reaction product is recovered and subjected to fractional distillation under reduced pressure. The bottoms from the distillation are treated with propanol and crystals recrystallized therefrom, said crystals being the desired product, namely, 1,3,5-tris-(1,3,4,5,6-pentachloro-5-norbornen-2-ylmethyl)benzene.

EXAMPLE VI

In this example a novel composition of matter of the present invention is prepared by admixing 100 parts of a commercial high molecular weight polyethylene with 15 parts of the flame retardant 1,4-bis-(1,3,4,5,6,7,7-heptachloro-5-norbornen-2-ylmethyl)benzene. Following the physical admixture of the components of the finished composition of matter, the composition is extruded and formed into flat, rectangular strips which contain a glass cloth in the center to prevent dripping. In addition, a set of rectangular strips similar in nature are formed by extruding only the commercial high molecular weight polyethylene. The two sets of strips are subjected to an oxygen index combustion test utilizing an apparatus similar to that described by C. P. Fenimore and J. F. Martin in the November, 1966 issue of *Modern Plastics*. The results of this test which measures the oxygen index (the lowest mole fraction of oxygen which is sufficient to maintain combustion) will show that the strip consisting only of polyethylene will have an oxygen index of 0.180 while the strip which comprises the mixture of the polyethylene and the 1,4-bis(1,3,4,5,6,7,7-heptachloro-5-norbornen-2-ylmethyl)benzene will possess an oxygen index greatly in excess of this number.

A second series of tests are also performed in conformity with the test known as Underwriters Laboratories Test Subject 94 or 746. In this test, a flat, rectangular specimen of material is prepared measuring approximately 5 inches long by 0.5 inches wide. Three specimens are aged in a full-draft circulating air oven for 168 hours at a temperature of approximately 70° C. Immediately after completion of the 168-hour period, the specimens are removed from the oven and cooled over calcium chloride in a dessicator for at least 4 hours at room temperature before testing. In addition, three identical unaged specimens are also tested. In performing the test, one of the aged specimens, with its longitudinal axis vertical, is supported by a clamp at its upper end so that its lower end is 12 inches above a flat horizontal layer of untreated surgical cotton. An unlighted Bunsen burner whose barrel has an inside diameter of three-eighth inch is supported under the specimen with the longitudinal axis of the barrel vertical and coincident with the longitudinal axis of the specimen, the tip of the barrel being three-eighth inch below the specimen. With the burner so supported and not in proximity to the specimen, the burner is ignited and adjusted to produce a steady blue flame with an overall height of three-fourth inch. The tests are conducted in a hood which is operated to provide adequate ventilation, but does not affect the flame. The burner flame is moved into position under the specimen, kept there for 10 seconds and then removed. Counting from the instant of removal from the burner flame, the duration of any flaming of the specimen is noted and recorded. Note is also taken and recorded of whether any flaming particles or flaming drops fall from the specimen and ignite the cotton.

The material of which the specimen is representative is acceptable if flaming of the specimen ceases within 10 seconds and if the cotton is not ignited by any particles or drops released during or after the application of the burner flame. If the specimen is acceptable to these conditions, the burner flame is returned immediately to its position under the specimen immediately after flaming of the specimen ceases, kept there for 10 seconds and then removed. The material is acceptable if flaming of the specimen ceases within 10 seconds, glowing ceases within 10 seconds after flaming ceases and if the cotton is not ignited by any particles or drops released during or after application of the burner flame.

If the first specimen passes the two trials set forth above, the trials are repeated on the two remaining aged specimens and the average of the six durations of flaming is determined. The material of which the three specimens are representative is acceptable if the average duration does not exceed 5 seconds. If the three aged specimens are acceptable, the procedure is repeated on the three remaining unaged specimens. It will be found that the strip which contains only the polyethylene will burn and will not be self-extinguishing while the strips which contain the 1,4-bis(1,3,4,5,6,7,7-heptachloro-5-norbornen-2-ylmethyl)benzene will have a relatively short time to self-extinguishment and either have a small amount of dripping or melting or no burning drops of material on the cotton.

EXAMPLE VII

A novel composition of matter of the present invention is prepared by admixing 100 parts of a commercial high molecular weight polypropylene along with 25 parts of 1,3,5-tris(1,3,4,5,6,7,7-heptachloro-5-norbornen-2-ylmethyl)benzene. After physical admixture of the two components of the novel composition of matter, the resulting admixture is extruded into strips of material similar to that set forth in Example VI above. Another set of strips is prepared and extruded using only the high molecular weight polypropylene. Following the preparation of the strips, they are subjected to an oxygen index test similar to that which was used in Example VI above. It will be found that the oxygen index of the commercial high molecular weight polypropylene alone is 0.180 while the oxygen index of the novel composition of matter of the present invention will be considerably in excess of this figure. Likewise, when the polypropylene alone and the novel composition of matter of the present invention comprising an admixture of polypropylene and 1,3,5-tris(1,3,4,5,6,7,7-heptachloro-5-norbornen-2-ylmethyl)benzene is tested according to Underwriters Laboratories Test Subject 94, it will be found that the novel composition of matter will show a short time to self-extinguishment with little or no burning drops of material, while that of the polypropylene alone will show burning with no self-extinguishment.

EXAMPLE VIII

In a manner similar to that set forth in the above examples, a mixture of an acrylonitrile-butadiene-styrene formulation known in the trade as ABS and 1,4-bis(1,3,4,5,6,7,7-heptachloro-5-norbornen-2-ylmethyl)benzene is prepared by admixing 100 parts of the ABS with 20 parts of the substituted benzene. The resulting admixture after extrusion is subjected to oxygen index and ULT Subject 94 tests in a manner similar to that set forth in the above examples. These compositions of matter are compared with specimens which are prepared from only ABS. It will be found that the strips of the novel composition of matter of the present invention will possess an oxygen index greater than that of the commercial ABS formulation alone, the latter being 0.183. In addition specimens of the mixture of ABS and 1,4-bis(1,3,4,5,6,7,7-hetachloro-5-norbornen-2-ylmethyl)benzene when tested according to the method set forth in ULT Subject 94 will be found to be self-extinguishing as compared to the ABS formulation which will burn and will not be self-extinguishing.

EXAMPLE IX

In this example 100 parts of an epoxy resin formed by the reaction between epichlorohydrin and bisphenol-A is admixed with 15 parts of 1,3-bis(1,3,4,5,6-pentachloro-5-norbornen-2-ylmethyl)benzene. After physical admixture and cooling of the resin-benzene mixture, the cured composition of matter is cut into strips. These strips are subjected to oxygen index and ULT Subject 94 tests in comparison with strips which were prepared from only the epoxy resin. The strips which comprised the novel composition of matter of the present invention will be found to have an oxygen index greater than that which is possessed by the epoxy resin alone and in addition will also exhibit non-burning and self-extinguishing characteristics as opposed to the epoxy resin strip which will burn and will not be self-extinguishing.

EXAMPLE X

In like manner a novel composition of matter of the present invention is prepared from a polyester resulting from the reaction of maleic anhydride and propylene glycol which has been cross-linked with styrene. The polyester and the flame retardant compound comprising 1,3,5-tris(1,3,4,5,6-pentachloro-5-norbornen-2-ylmethyl)benzene are admixed in a ratio of 100 parts of the polyester to 20 parts of the substituted benzene. The resulting composition of matter is extruded after milling and is cut into strips. These strips are subjected to an oxygen index test and compared to strips which have been formed only of the polyester. It will be found that the former strips will possess an oxygen index greatly in excess of that which is possessed by the polyester strips alone. Other comparisons are made between the strips comprising the novel composition of matter and the polyester alone utilizing the ULT Subject 94 test method. The polyester strips alone will burn and will not be self-extinguishing as compared to the strips comprising a mixture of the polyester and 1,3,5-tris(1,3,4,5,6-pentachloro-5-norbornen-2-ylmethyl)benzene; that is, these latter strips possess a short time to self-extinguishment with little or no amount of burning material falling therefrom.

I claim as my invention:

1. A compound having the formula:

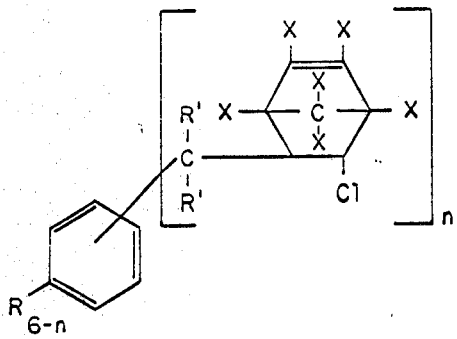

wherein X is hydrogen or chlorine or bromine, at least two X's being chlorine or bromine, R' is hydrogen or lower alkyl, R is hydrogen or alkyl of from 1 to about 4 carbon atoms, and *n* is an integer of from 2 to 6.

2. A compound as defined in claim 1 wherein X is chlorine.

3. A compound as defined in claim 1 wherein X is bromine.

4. The compound of claim 1 being 1,4-bis(1,3,4,5,6,7,7-heptachloro-5-norbornen-2-ylmethyl)benzene.

5. The compound of claim 1 being 1,3,5-tris(1,3,4,5,6,7,7-heptachloro-5-norbornen-2-ylmethyl)benzene.

6. The compound of claim 1 being 1,4-bis(1,3,4,5,6,7,7-heptachloro-5-norbornen-2-ylmethyl)-2,3,5,6-tetramethylbenzene.

7. The compound of claim 1 being 1,3-bis(1,3,4,5,6-pentachloro-5-norbornen-2-ylmethyl)benzene.

8. The compound of claim 1 being 1,3,5-tris(1,3,4,5,6-pentachloro-5-norbornen-2-ylmethyl)benzene.

* * * * *